Jan. 29, 1952     D. I. BOHN     2,584,098
RADIAL ENGINE
Filed Nov. 24, 1950

INVENTOR.
DONALD I. BOHN
BY
Ostrolenk & Faber
ATTORNEYS

Patented Jan. 29, 1952

2,584,098

UNITED STATES PATENT OFFICE 2,584,098

RADIAL ENGINE

Donald I. Bohn, Pittsburgh, Pa., assignor to Nordberg Manufacturing Company, Milwaukee, Wis., a corporation of Wisconsin Application November 24, 1950, Serial No. 197,371

10 Claims. (Cl. 74—580)

My present invention relates to radial internal combustion engines and more particularly to novel means for maintaining the master crank pin bearing assembly at a fixed non-rotating angular position while nevertheless it has its normal gyratory or curvilinear translatory motion.

The conventional airplane engine of radial construction employs one master rod for each bank of cylinders. This master rod resembles an ordinary connecting rod in that it has a wrist pin at one end and a crank pin bearing at the other end. In addition, the crank pin bearing has a number of knuckle pins to which are fastened connecting rods going to all of the pistons except the one connected directly to the master rod.

This method has the decided advantage of being light and economical both as to space and cost. It does, however, introduce unbalanced dynamic forces in the engine of such characteristics that they cannot be readily balanced out or their effect eliminated by any known scheme or the employment of additional devices.

In order to use the general design of the radial engine for large stationary engines, it has been deemed advisable to eliminate the inherent unbalance resulting from the conventional single master rod. This, up to the present time, has been performed in the following ways:

1. The master crank pin bearing assembly carries knuckle pins for all of the cylinders. Such a construction by itself is kinematically unstable and four gears arranged in planetary fashion are employed in the Nordberg engine to prevent the undesirable rotation in either direction of this master assembly.

2. A scheme involving three floating links employed in the Sharpe Patent No. 2,264,484.

3. Schemes involving various linkages.

The planetary gear scheme provides excellent balance and operational characteristics. It is, however, very expensive involving four high-quality precision gears and is susceptible to severe trouble or damage in the event of bearing failure.

The design of the Sharpe patent while less expensive involves elements which are susceptible to undesirable damage due to the extraordinary loading on the bearings in the event of a failure of a main or crank pin engine bearing.

Link connections, where they have been used, have extended around the entire bearing thereby necessitating an increase in radial size of the engine or requiring a comparatively weak link.

A primary object of my present invention, however, is that no mechanical ties are provided between the master crank pin bearing assembly and any part of the engine frame or crank case.

Thus, no excessive loading will occur on any of the parts either in operation or in the event of a failure of any of the elements.

This lack of connection to stationary parts of the engine obviates the objections of the devices previously used and provides a novel, useful and inexpensive apparatus for maintaining the angular position of the master bearing.

Essentially, my invention contemplates a radial engine in which two opposite knuckle pins in the master bearing are each provided with crank elements, the crank elements having pins which are interconnected by a rigid tie link, the rigid tie link having a central opening which will clear the crank pin and permit unimpeded rotation of the crank pin. The link is displaced axially of the bearing so that it need only pass around the crank pin and not around the bearing, thereby making it possible to obtain an extremely strong link without increase in the radius of the engine as a whole.

The link, the two knuckle pin cranks and the two knuckle pins tied together provide a simple linkage to cause the angle of the two master connecting rods with respect to the master bearing to remain always at the same value, thereby preventing any rotation of the bearing on its own axis while it is going through its gyratory or curvilinear translatory motion.

Another object of my invention is, therefore, the utilization of a simple floating linkage cooperating with a pair of opposite master connecting rods to cause the angle of these rods with respect to a diameter of the master bearing to remain identical at all positions of the bearing.

The foregoing and many other objects of my invention will become apparent in the following description and drawings in which.

Referring to the figures, the crank shaft 21 is provided with an upper main journal 20 and a lower main journal 22, both of these journals operating on conventional bushings or bearings which are not shown but which are well understood in the art of radial engines.

Figure 1:
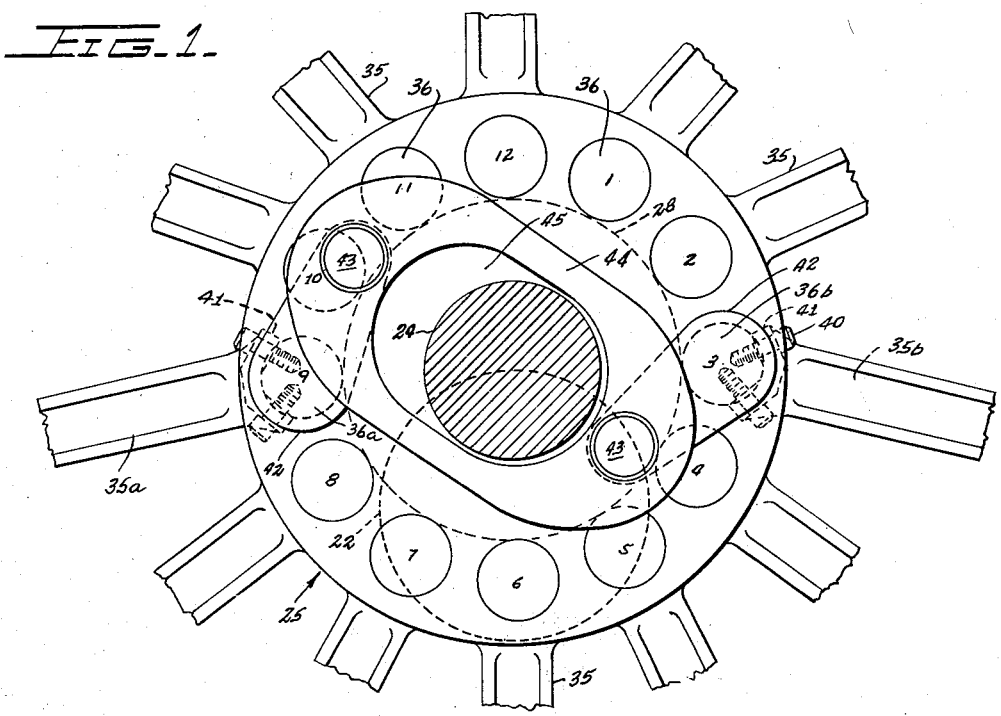
Figure 1 is a cross-sectional view through a radial engine utilizing my novel linkage and taken from line 1—1 of Figure 2 looking in the direction of the arrows.
Figure 2:
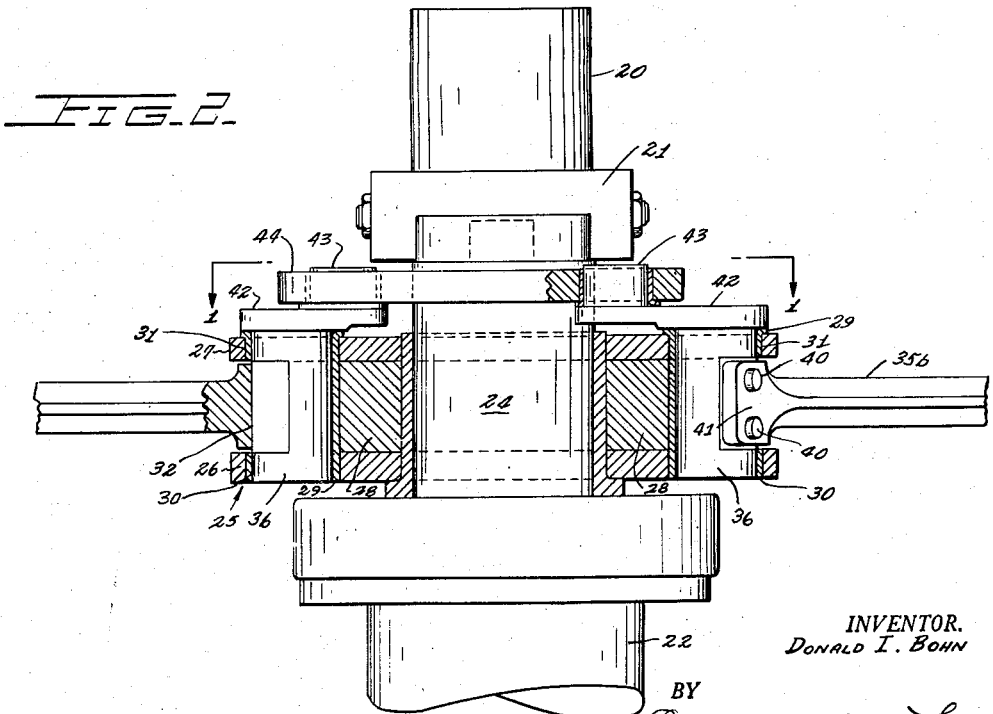
Figure 2 is an elevation of my novel radial engine with the individual pistons and cylinders cut away since the arrangement of these elements is well-known in the art.

In line with the journals 20 and 21 in Figure 2 is the crank pin 24. The crank pin 24 between these journals happens to be shown in line with them because of the particular view selected in Figure 2. Actually the crank pin 24 is offset from these journals as shown in the cross-sectional view of Figure 1.

The offset of the crank pin 24 is the principal element which, of course, causes the entire crank shaft to rotate in response to the operation of the various pistons and cylinders and thereby transmit power in the form of rotary motion.

The master crank pin bearing assembly 25 comprises a pair of circular discs 26 and 27 having in its central portion crank pin bushing 28 and knuckle pin bushings 29 extending adjacent the periphery.

The engine here shown is a twelve cylinder unit intended to have twelve knuckle pins and, therefore, being provided with twelve knuckle pin bushings 29. The knuckle pin bushings 29 are mounted and secured in position in appropriate openings 30, 31 in the plates 26 and 27 of the crank pin bearing assembly 25. Knuckle pin bushings 29 are cut away at 32 to provide a longitudinal slot directed toward the outer periphery of the crank pin bearing assembly 25 to permit each of the twelve connecting rods 35 to be bolted to the knuckle pin 36 mounted in the knuckle pin bushing 29.

The method of connection to the knuckle pin 36 is particularly shown in the figures for cylinder connections 3 and 9. The rods 35 are each connected to their knuckle pin 36 by means of four cap screws 40 passing through flanges 41 at the ends of the connecting rods 35 and into the knuckle pin 36, the opening 32 being sufficiently wide to permit this connection to be made.

The basic principle of the present invention provides for the interconnection of two knuckle pins so that they are integrated and so that their angular displacements about their center lines remain always the same.

Consequently, the knuckle pins 36 for cylinders 3 and 9 in the figures differ from the other knuckle pins for cylinders 1, 2, 4 to 8 and 10 to 12 only in their integration with each other. Otherwise their operation is the same.

The knuckle pins 36a for cylinder 9 and 36b for cylinder 3 are each provided with a horizontal crank member 42, 42 integral therewith and, of course, extending at right angles thereto. Each of the horizontal crank members 42, 42 is provided with a journal 43, 43. Rigid connecting link 44 is provided between the journals 43, 43, the said connecting link 44 being split so that it may be fastened around the crank pin 24 and having an elongated hole 45 in its center to permit full operation of the crank pin 24.

Link 44 is displaced axially of the bearing thereby permitting the curvature of the arc in the link to be greatly reduced so that it will pass over the crank only without having to pass around the entire bearing.

Since the forces to which the link is subjected are only in the direction of the center line through the end bearings of the link, the reduction of the width of the link reduces moment arms at the divided part of the link, thus permitting increased strength.

The positioning of the link 44 in my invention so that it extends around the crank shaft rather than around the bearing permits the link to be widened as much as may be necessary to resist all loads or thrusts without going beyond the confines of the machine where it may interfere with the cylinders.

The axial displacement of my link 44 rather than the radial displacement of the link permits the link to be given any desired thickness or structural configuration which may be necessary to resist the forces involved.

Such an increase in thickness would only require a corresponding lengthening of the crank pin since in most engines some slight longitudinal lengthening can be done without increases in overall size, while radial lengthening requires a complete redesign of the machine.

The purpose of the link 44 is to tie together the knuckle pins 36a and 36b and the hole 45 is sufficiently large so that this tie can be obtained to ensure a fixed center distance between the journals 36 for the pins of cylinders 3 and 9 and hence for all the cylinders without touching or rubbing the crank pin 24.

During the course of rotation of the engine, all of the connecting rods 35 naturally vary their angle with respect to the knuckle pins and the master crank pin bearing assembly 25 in accordance with the rotation of crank pin 24 imparted thereto by the successive operation of the cylinders of the engine.

It will be understood since it is well-known that each of the connecting rods 35 is connected to a piston which in turn is mounted in a cylinder, the pistons being driven in appropriate sequence by methods well-known in the art of internal combustion engines.

As previously pointed out, the principal element in the operation of a radial engine of this type is to ensure that the master crank pin bearing assembly 25, while it has curvilinear translatory motion, does not rotate in any geographical sense—in other words, that any portion of master crank pin bearing assembly 25 which is pointing north at the beginning of the cycle should be directed in the same north direction at all portions of the cycle although the master crank pin bearing assembly 25 does have translatory motion in response to the operation in sequence of the pistons and connecting rods.

While heretofore this operation was performed either by securing one of the connecting rods rigidly to the master crank pin bearing assembly or by a plurality of linkages in quadrature on the master crank pin bearing assembly or by the use of planetary gears, my invention ensures this result by the simple expedient of linking together by means of link 44 two of the opposite knuckle pins 36a and 36b so that the angle of these knuckle pins with respect to a diameter through the crank shaft will always remain the same.

This angle data may be such for each of the two opposite connecting rods 35a and 35b that these rods are always held at 180° from each other.

It has been found, however, that by rotating crank pin bearing assembly 25 a very small amount such as 2° with respect to the diameter will reduce the forces reacting against the two cylinders carrying the master rods 35a and 35b. If this angle is held at 2° or at an appropriate angle determined by experiment for any particular engine, the torque will always be in one direction.

The torque which is present is naturally that tending to rotate the master crank pin bearing assembly 25 during its translatory movement.

The function of the master connecting rods 35a, 35b, their respective knuckle pins and their cranks 42 and connecting link 44 is to prevent this rotation while permitting the translatory movement to occur. This rotational torque will tend to reverse itself at times so that the torque is not inherently unidirectional, thereby setting up excess stresses on the connecting rods 35a and 35b.

I have found, however, that a particular angle of lag which may be of the order of 2° as shown will tend to result in a unidirectional torque on the master crank pin bearing assembly 25.

Thus, by my novel and simplified linkage integrating two of the opposite knuckle pins to maintain an exact angular relation with each other, the gyratory or curvilinear translatory motion of the master crank pin bearing assembly 25 is maintained while rotational movement thereof is prevented.

My invention by displacing the link 44 axially of the bearing rather than radially of the bearing permits the width of the divided part in the link to be greatly reduced so that it will pass over the crank only without having to pass around the entire bearing.

The positioning of the link 44 in my invention so that it extends around the crank pin only rather than around the bearing permits the link to be widened as much as may be necessary to resist all loads or thrusts without going beyond the confines of the machine where it may interfere with the cylinders.

The axial displacement of my link 44 rather than the radial displacement of the link permits the link to be given any desired thickness or structural configuration which may be necessary to resist the compressive thrusts.

Such an increase in thickness would only require a corresponding lengthening of crank pin since in most engines some slight longitudinal lenthening can be done without increases in overall size, while radial lengthening requires a complete redesign of the machine.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a radial engine, a plurality of radially arranged cylinders, a piston individual to each cylinder; a connecting rod individual to each piston; a crank shaft having a crank pin; a bearing on said crank pin; a knuckle pin individual to each connecting rod and connecting each connecting rod to said bearing; a link axially displaced from said bearing; said link connecting a pair of knuckle pins.

2. In a radial engine, a plurality of radially arranged cylinders, a piston individual to each cylinder; a connecting rod individual to each piston; a crank shaft having a crank pin; a bearing on said crank pin; a knuckle pin individual to each connecting rod and connecting each connecting rod to said bearing; a link axially displaced from said bearing; a crank member extending from each of a pair of knuckle pins, said link connecting said crank members.

3. In a radial engine, a plurality of radially arranged cylinders, a piston individual to each cylinder; a connecting rod individual to each piston; a crank shaft having a crank pin; a bearing on said crank pin; a knuckle pin individual to each connecting rod and connecting each connecting rod to said bearing; a link axially displaced from said bearing; a crank member extending from each of a pair of diametrically opposite knuckle pins; said link connecting said crank members.

4. In a radial engine, a plurality of radially arranged cylinders, a piston individual to each cylinder; a connecting rod individual to each piston; a crank shaft having a crank pin; a bearing on said crank pin; a knuckle pin individual to each connecting rod and connecting each connecting rod to said bearing; a link axially displaced from said bearing; a crank member extending from each of a pair of diametrically opposite knuckle pins; said link connecting said crank members; said link having an opening therein receiving said crank pin.

5. In a radial engine, a plurality of radially arranged cylinders, a piston individual to each cylinder; a connecting rod individual to each piston; a crank shaft having a crank pin; a bearing on said crank pin; a knuckle pin individual to each connecting rod and connecting each connecting rod to said bearing; a link axially displaced from said bearing; a crank member extending from each of a pair of diametrically opposite knuckle pins; said link connecting said crank members; said link having an opening therein receiving said crank pin; an inner boundary of said opening extending radially from said crank pin less than the distance which an outer boundary of said bearing extends from the crank pin.

6. In a radial engine having a plurality of radially arranged cylinders and a piston individual to each cylinder, and a connecting rod individual to each piston, a crank shaft having a crank pin, a bearing on said crank pin, a knuckle pin individual to each connecting rod and pivotally connecting each connecting rod to said bearing, and a link connecting a pair of said knuckle pins, said link being formed and adapted to lie at all positions substantially within the outer periphery of said bearing.

7. In a radial engine having a plurality of radially arranged cylinders and a piston individual to each piston, a crank shaft having a crank pin, a bearing on said crank pin, a knuckle pin individual to each connecting rod and pivotally connecting each connecting rod to said bearing, each said knuckle pin being connected intermediate its ends to its associated connecting rod, and a link axially displaced from said bearing, said link connecting a pair of said knuckle pins.

8. In a radial engine having a plurality of radially arranged cylinders and a piston individual to each piston, a crank shaft having a crank pin, a bearing on said crank pin, a knuckle pin individual to each connecting rod and pivotally connecting each connecting rod to said bearing, each said knuckle pin being connected intermediate its ends to its associated connecting rod, and a link axially displaced from said bearing, said link connecting a pair of said knuckle pins, and said link being formed and adapted to lie at all positions substantially within the outer periphery of the bearing.

9. In a radial engine having a plurality of radially arranged cylinders and a piston individual to each cylinder, and a connecting rod individual to each piston, a crank shaft having a crank pin, a generally annular bearing on said crank pin, a knuckle pin individual to each connecting rod and pivotally connecting each connecting rod to said bearing, the axes of the knuckle pins being equi-distant from the axis of the crank pin, and a link connecting a pair of said knuckle pins, said link being formed and adapted to lie at all positions substantially within the circle defined by the axis of said knuckle pins.

10. In a radial engine having a plurality of radially arranged cylinders and a piston individual to each cylinder, a connecting rod individual to each piston, a crank shaft having a crank pin, a bearing on said crank pin, a knuckle pin individual to each connecting rod and pivotally connecting each connecting rod to said bearing, two of said knuckle pins having cranks at their ends, and an elongated link axially displaced from said bearing, said link connecting said cranks, said link being apertured closely to surround the crank pin and having adjacent each end a pivotal connection with one of said cranks.

DONALD I. BOHN.

No references cited.